United States Patent [19]

Wen

[11] Patent Number: 5,797,688
[45] Date of Patent: Aug. 25, 1998

[54] THERMAL DYE TRANSFER PRINTING OF COMPACT DISC LABELS INCLUDING A CIRCULAR RECESSED CARRIER

[75] Inventor: Xin Wen, Rochester, N.Y.

[73] Assignee: Eastman Kodak Company, Rochester, N.Y.

[21] Appl. No.: 779,512

[22] Filed: Jan. 7, 1997

[51] Int. Cl.⁶ ............................................. B41J 3/28
[52] U.S. Cl. ................... 400/48; 101/126; 101/35; 101/474; 400/120.01; 400/120.16
[58] Field of Search ........................ 400/27, 28, 59, 400/58, 120.16, 525, 23, 531, 48, 120.17, 120.01; 101/35, 41, 126, 474

[56] References Cited

U.S. PATENT DOCUMENTS

| | | | |
|---|---|---|---|
| 5,429,045 | 7/1995 | Karlyn et al. | 101/35 |
| 5,542,768 | 8/1996 | Rother et al. | 400/120.16 |
| 5,549,043 | 8/1996 | Tranin | 101/126 |

*Primary Examiner*—Christopher A. Bennett
*Attorney, Agent, or Firm*—Walter S. Stevens

[57] ABSTRACT

Apparatus for printing labels onto circular discs of predetermined diameter includes a linear printhead having a length equal to at least the diameter of the discs to be printed. A carrier has a planar surface with a circular recess into which a compact disc can be tightly inserted. The recess is of a depth substantially equal to the thickness of the disc to be printed, whereby the planar surface and a surface of an inserted disc form a substantially flat surface. The carrier is formed of a substrate and a member which defines the outer boundary of the recess. The substrate is at least partially formed of an elastic material having a compliance selected so as to provide a pressure on the printhead optimal for dye transfer. A second rigid member fits into a center hole in the inserted compact disc.

4 Claims, 3 Drawing Sheets

THERMAL DYE TRANSFER PRINTING OF COMPACT DISC LABELS INCLUDING A CIRCULAR RECESSED CARRIER

BACKGROUND OF THE INVENTION

1. Technical Field

This invention relates generally to printing onto discs, such as printing labels onto compact discs and the like.

2. Background Art

Compact disc is a high-volume and longevity data storage medium. A recordable compact disc typically contains a polycarbonate disc that is coated with a dye layer, a metallized reflective layer, and a protective layer. Cyanine, phthalocyanine, and metallized azo dyes are the common dye polymers coated in the dye layer. The metallized reflective layer typically consists of gold in recordable compact discs, and aluminum in CD-ROMs. In a compact disc writer, a laser beam illuminates the dye polymers through the polycarbonate disc as the disc spins. The illumination is turned on and off at selective locations determined by the input digital signal. Heating of selected locations by the laser causes the dye layer to melt and/or chemically degrade at these locations, forming slight depressions or marks in the dye polymer. The degraded dye polymers in the marked regions are less reflective than the un-marked regions.

During the reading process, a low-power laser scans the dye polymer layer in a recorded disc. The laser light is reflected directly from the unmarked regions, while the laser light is scattered from the marked regions. A sensor monitors the transitions between the marked and un-marked regions in response to the intensity of the reflective light, and translates the transitions into data.

Similar to the above process, a CD-ROM differentiates the intensity of the reflective light by pits and lands in the compact discs. These pits and lands are pre-recorded by mechanical pressing the compact discs, typically by means of mass production.

The compact discs are often coated with a printable surface opposite to the surface from which the data is recorded and retrieved. A label may be printed on the printable surface. The label content may comprise logos, trademarks, text, graphics, bar codes, etc. Generally, the label content is related to the data stored on the compact disc. The label also protects the compact disc from physical damage. Because the compact disc spins at high speed in the writer and the player, the compact disc label needs to be precisely balanced to the center of the disc for smooth rotation.

The labels have traditionally been printed by the screen printing technique for applications in which the same image is printed on a large number of compact discs. For recordable compact disc recording, smaller number compact discs are usually recorded containing the same information. For these applications, it is desirable to alter the label content on each "shortrun" of the recordable compact disc.

It is not economical to use the traditional screen printing due to its high cost and long set-up time involved in each image. Digital printing is more suitable, since the label content can be easily altered on a computer. The presently used digital printing techniques are ink jet and thermal wax transfer. The ink jet printing requires a hydroscopic coating on the compact disc surface for accepting aqueous ink solutions. The thermal wax transfer can print on lacquer (shiny), matte, or silk-screened disc surfaces. Both printing techniques are bi-model in the density scale, and are not suitable of printing continuous-tone photographic images.

However, the market has long needed the ability to print photographic images on the compact disc labels. For instance, for compact discs containing a plurality of photographic images, it is desirable to display thumbnail images on the label of the compact discs to serve as an index to the stored image content. It is commonly believed that digital photographic images are best printed with a continuous tone thermal dye diffusion (sublimation) printers.

Referring to FIGS. 1 and 2, prior art techniques of label printing on compact disc using the thermal wax transfer involves the steps of placing a compact disc 10 onto a carrier 12 that has a metal pin 14 that fits in a central hole of the compact disc. Four metal posts 16–19 on the carrier engage the outer edge the compact disc to define the position of the compact disc during printing. As shown in FIG. 3, compact disc 10 is transported by carrier 12 into contact with a printhead 20 that presses a dye donor web, not shown, against a label surface of the compact disc. The printing is conducted as the compact disc is transported underneath the printhead. Additional details of such printing techniques can be found in U.S. Pat. No. 5,542,768, which issued to D. Rother et al. on Aug. 6, 1996.

One disadvantage of the above-described printing method is a variable printhead pressure against the compact disc during printing. The length of contact between the printhead and the compact disc surface varies as the printhead moves along the disc surface. For example, the contact length increased from print position (a,a') to (b,b') in FIG. 3. For constant head load, the pressure at the nip between the printhead and the compact disc decreases from (a,a') to (b,b') in FIG. 3. Although this problem does not severely affect the quality of thermal wax printing because of its bi-modal nature, it is an obstacle for thermal dye diffusion printing because thermal dye transfer efficiency is quite sensitive to the nip pressure. The variation in nip pressure causes non-uniform printing density (e.g. banding), shifts in color balance, and other image defects.

An additional disadvantage of the above described printing technique is related to the fact that printhead moves across the outer edges of the compact disc under pressure during printing. This tends to cause excess wear of the printhead.

DISCLOSURE OF THE INVENTION

It is an object of the present invention to overcome the above difficulties by a novel thermal resistive dye printer and printing methods for printing labels on compact discs.

According to a feature of the present invention, apparatus for printing labels onto circular discs of predetermined diameter includes a linear printhead having a length equal to at least the diameter of the discs to be printed. A carrier has a planar surface with a circular recess into which a compact disc can be tightly inserted. The recess is of a depth substantially equal to the thickness of the disc to be printed, whereby the planar surface and a surface of an inserted disc form a substantially flat surface.

According to a preferred embodiment of the present invention, the carrier is formed of a substrate and a member which defines the outer boundary of the recess. The substrate is at least partially formed of an elastic material having a compliance selected so as to provide a pressure on the printhead optimal for dye transfer. A second rigid member fits into a center hole in the inserted compact disc.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which.

BEST MODE FOR CARRYING OUT THE INVENTION

The present description will be directed in particular to elements forming part of, or cooperating more directly with, apparatus in accordance with the present invention. It is to be understood that elements not specifically shown or described may take various forms well known to those skilled in the art.

Figure 1:
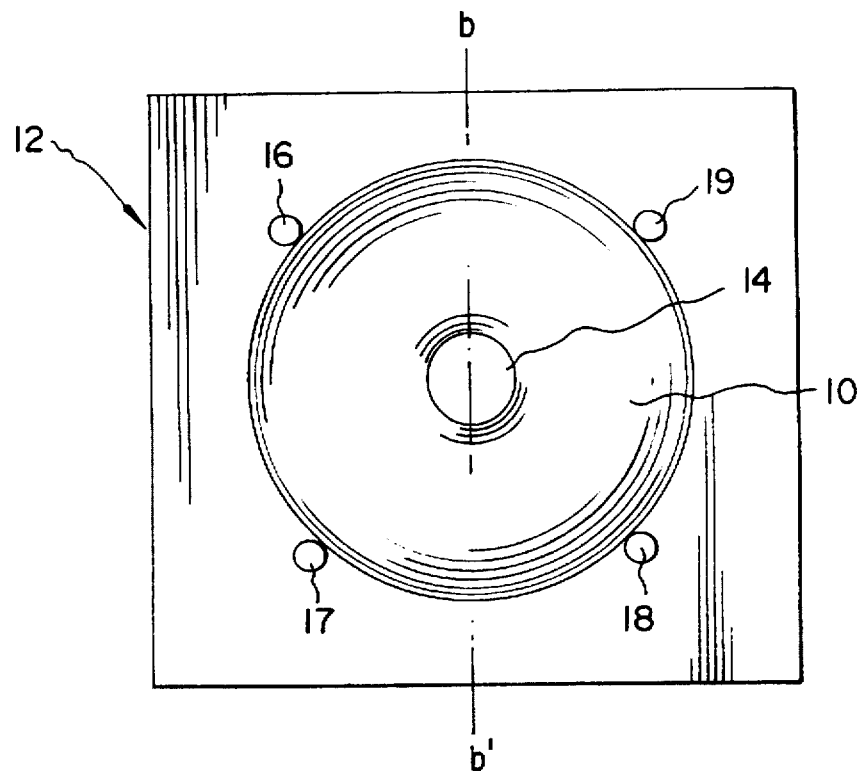
FIG. 1 is a top plan view of a compact disc and carrier according to a prior art printing technique.
Figure 2:
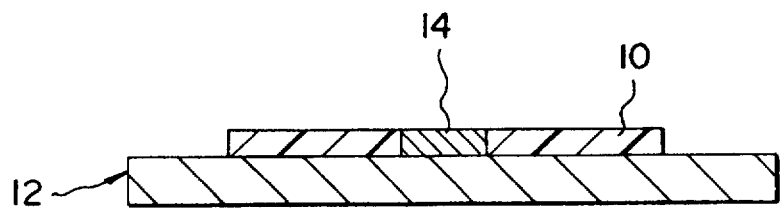
FIG. 2 is a sectional view of the compact disc and carrier taken along line b—b' of FIG. 1.
Figure 3:
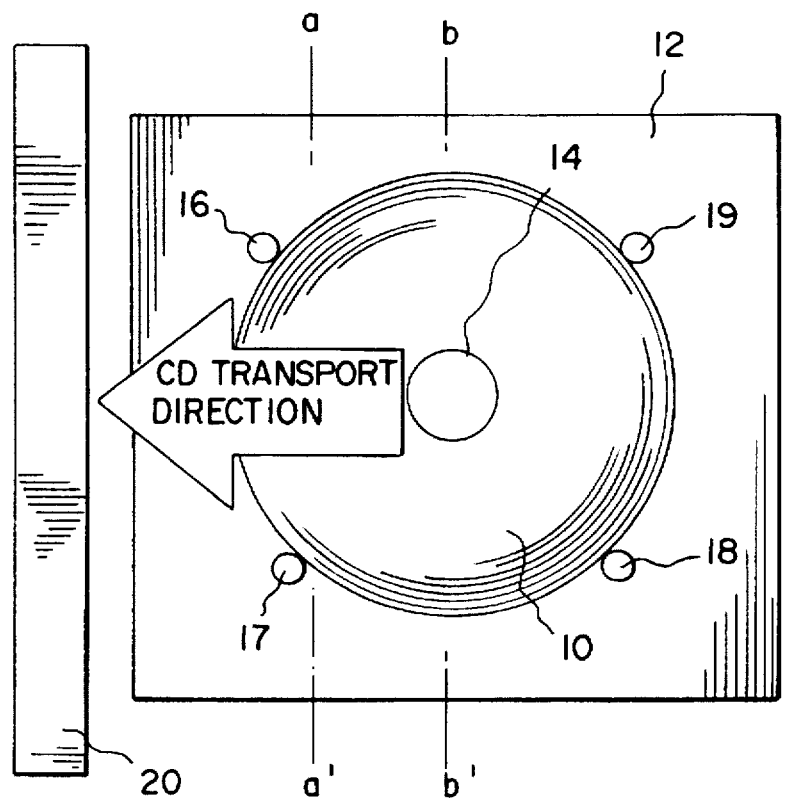
FIG. 3 is a top plan view of a compact disc label printing operation using a thermal resistive printer and the compact disc and carrier of FIGS. 1 and 2.
Figure 4:
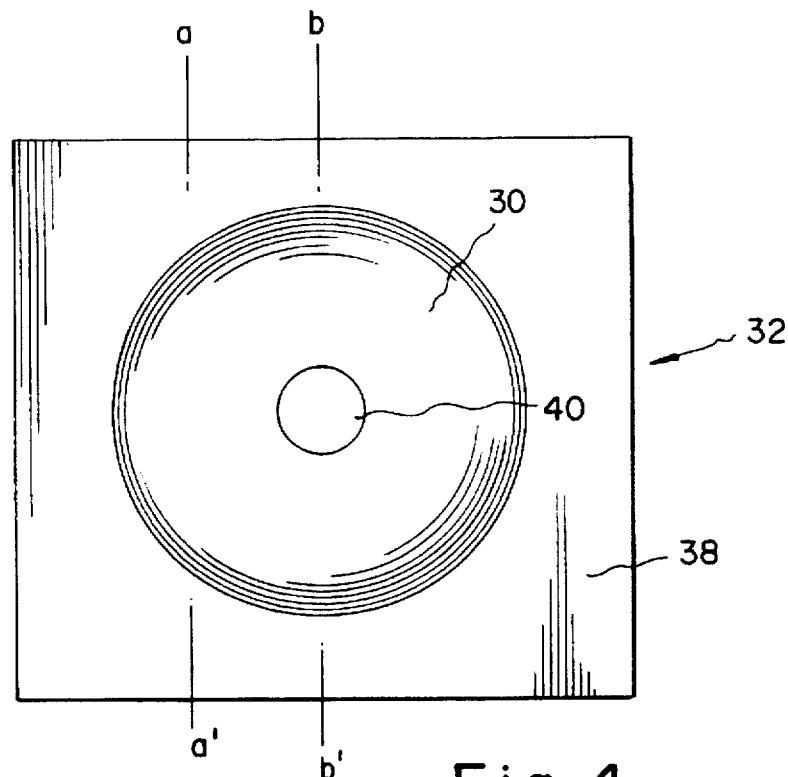
FIG. 4 is a top plan view of a compact disc and carrier according to a preferred embodiment of the present invention.
Figure 5:
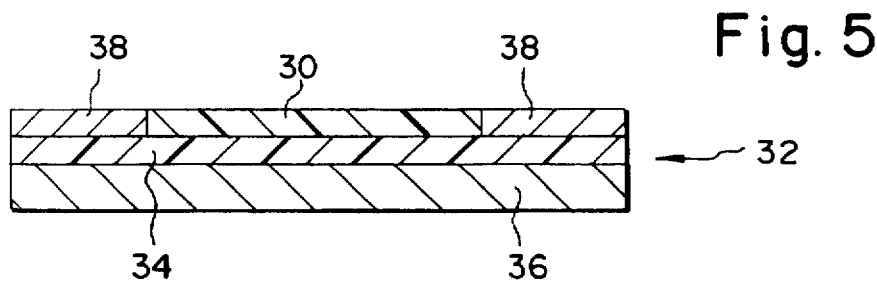
FIG. 5 is a sectional view of the compact disc and carrier taken along line a—a' of FIG. 4.
Figure 6:
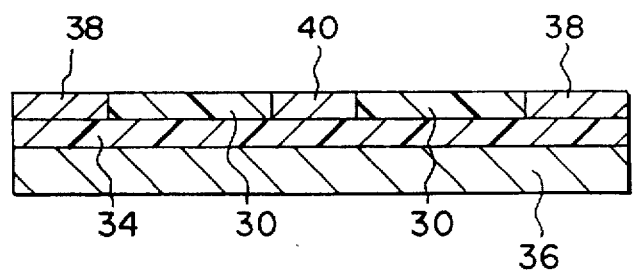
FIG. 6 is a sectional view of the compact disc and carrier taken along line b—b' of FIG. 4.

Referring to FIGS. 4–6, a compact disc 30 is held in a carrier 32. Carrier 32 is formed of an elastic member 34 bonded to a substrate 36. Two substantially rigid members 38 and 40 are bonded on elastic member 34. Rigid member 38 defines the outer boundary of a circular recess into which compact disc can be tightly inserted such that rigid member 40 fits into the center of the inserted compact disc. The thickness of the rigid members are substantially equal to the standard mean thickness of compact discs.

As compact disc 30 within carrier 32 is transported beneath a printhead during printing, the total contact length of the printhead remains constant. That is, the sum of the head interfaces with the compact disc in the imaging area and with the carrier in the non-imaging area is fixed over the entire printing sequence.

The compliance of elastic member 34 is preferably controlled so as to provide a nip pressure determined optimal for dye transfer. To increase the life of the compact disc carrier, a durable protective polymer coating such as fluorinated polymers may be applied to the surface that contacts the printhead. Since the surface of carrier 32 is at the same level as that of the compact disc, the nip pressure variation that is inherent in the prior art is greatly reduced. The printhead does not move into and out of the edges of the disc. This significantly reduces wear on the printhead.

ADVANTAGES

The present invention provides a simple technique that improves printing uniformity on compact disc labels using thermal resistive dye diffusion techniques. The invention is applicable also to thermal wax transfer printing. The printing method reduces the probability of damage to the thermal printhead.

The invention has been described in detail with particular reference to preferred embodiments thereof, but it will be understood that variations and modifications can be effected within the spirit and scope of the invention.

What is claimed is:

1. Apparatus for printing labels onto circular discs of predetermined diameter and having a center hole, said apparatus comprising:

a linear printhead having a length equal to at least the diameter of the discs to be printed; and a carrier having a planar surface with a circular recess therein into which one of the circular discs can be tightly inserted, said carrier including a substrate at least partially formed of an elastic material having compliance selected so as to provide a pressure on the printhead optimal for dye transfer, said recess being of a depth equal to the thickness of the disc to be printed, whereby the planar surface and a surface of an inserted disc form a substantially flat surface.

2. Apparatus as set forth in claim 1 wherein said carrier comprises a member which defines the outer boundary of the recess.

3. Apparatus as set forth in claim 2 wherein the member is bonded to the substrate.

4. Apparatus as set forth in claim 2 further comprising a second rigid member that fits into the center hole in the inserted circular disc.

* * * * *